(12) United States Patent
Cheng et al.

(10) Patent No.: US 9,333,931 B1
(45) Date of Patent: May 10, 2016

(54) PASSENGER PROTECTION SYSTEM

(71) Applicant: Ford Global Technologies, LLC, Dearborn, MI (US)

(72) Inventors: James Chih Cheng, Troy, MI (US); Parakrama V. Weerappuli, West Bloomfield, MI (US); Raed Essa El-Jawahri, Northville, MI (US); Mohammed Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/607,094

(22) Filed: Jan. 28, 2015

(51) Int. Cl.
| | | |
|---|---|---|
| *B60R 21/16* | (2006.01) | |
| *B60R 21/08* | (2006.01) | |
| *B60R 21/207* | (2006.01) | |
| *B60R 21/00* | (2006.01) | |

(52) U.S. Cl.
CPC ............... *B60R 21/08* (2013.01); *B60R 21/16* (2013.01); *B60R 21/207* (2013.01); *B60R 2021/0006* (2013.01)

(58) Field of Classification Search
CPC .............................. B60R 21/16; B60R 21/207
USPC ....................... 280/730.2, 748, 749
See application file for complete search history.

(56) References Cited

U.S. PATENT DOCUMENTS

| | | | |
|---|---|---|---|
| 3,633,936 A | | 1/1972 | Huber |
| 3,687,485 A | * | 8/1972 | Campbell ..................... 280/733 |
| 4,168,094 A | * | 9/1979 | Yagi ........................ B60R 5/047 296/37.16 |
| 5,462,308 A | | 10/1995 | Seki et al. |
| 5,464,246 A | * | 11/1995 | Castro et al. ............... 280/730.2 |
| 5,806,923 A | * | 9/1998 | Tschaschke et al. ...... 297/216.13 |
| 5,971,433 A | * | 10/1999 | Ament et al. .................. 280/749 |
| 6,029,993 A | * | 2/2000 | Mueller ..................... 280/730.2 |
| 8,596,673 B2 | | 12/2013 | Ruedisueli et al. |
| 8,814,202 B2 | | 8/2014 | Matsushita et al. |
| 2006/0043706 A1 | | 3/2006 | Kosugi et al. |
| 2013/0334799 A1* | | 12/2013 | Suga et al. ................. 280/730.2 |
| 2014/0300088 A1* | | 10/2014 | Fukawatase .................. 280/729 |
| 2015/0203065 A1* | | 7/2015 | Egusa ........................ 280/730.2 |

FOREIGN PATENT DOCUMENTS

| | | | | |
|---|---|---|---|---|
| JP | H07291084 | | 11/1995 | |
| JP | 20051412 | | 1/2005 | |
| JP | 2013123989 A | * | 6/2013 | ............ B60R 21/207 |
| JP | 2013166535 | | 8/2013 | |

* cited by examiner

*Primary Examiner* — Faye M Fleming
(74) *Attorney, Agent, or Firm* — Frank A. MacKenzie; Bejin Bieneman PLC

(57) ABSTRACT

A passenger protection system includes a rotatable attachment mountable in a vehicle seat back, a first frame member rotatably connected to the rotatable attachment, and a flexible sheet having an upper edge connected to the first frame member.

20 Claims, 8 Drawing Sheets

PASSENGER PROTECTION SYSTEM

BACKGROUND

Oblique impacts in a vehicle may be defined as impacts that occur at an angle of 10-50 degrees relative to the vehicle's trajectory. During an oblique impact, occupants of the vehicle typically move forward and laterally with respect to a length of the vehicle. Improved systems are needed for absorbing crash energy during an oblique impact.

DETAILED DESCRIPTION

Figure 1:
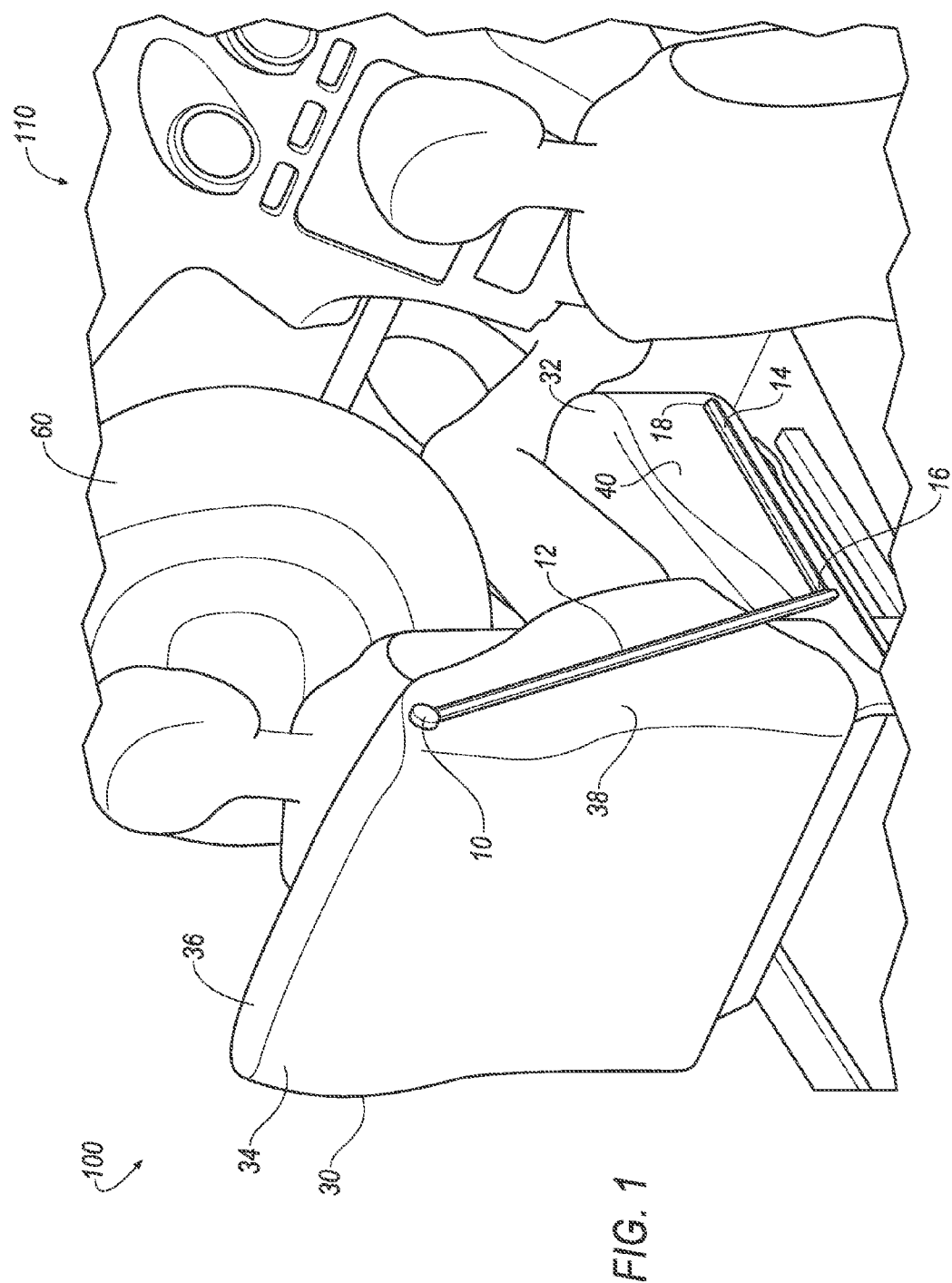
FIG. 1 is a perspective view of an example of a passenger protection system in an undeployed state.

With reference to the Figures, wherein like numerals indicate like parts throughout the several views, a passenger protection system 100 includes a rotatable attachment 10, a first frame member 12, and a flexible sheet 24. During an oblique impact, a controller 72 included in an impact sensing sub-system 70 activates a triggering mechanism 11, which causes actuation of a rotatable attachment 10, deploying the flexible sheet 24, which is then positioned to receive an occupant moving both forward and laterally with respect to a longitudinal axis of the vehicle 110, thereby absorbing impact energy from the occupant.

The rotatable attachment 10 connects the first frame member 12 to a mountable portion of the vehicle 110, e.g., a vehicle seat 30. The vehicle seat 30 generally includes a seat base 32 and a seat back 34. The rotatable attachment 10 may be attached at a suitable mounting location, e.g., proximate to an upper edge 36 of the vehicle seat 30. During the oblique impact, the rotatable attachment 10 rotates the first frame member 12 to a deployed state, deploying the flexible sheet 24 such that the sheet 24 can receive the occupant.

The first frame member 12 may be rotatably connected to the rotatable attachment 10, i.e., connect to the rotatable attachment 10 in such a way that rotation of the rotatable attachment 10 causes rotation of the frame member 12. The first frame member 12 may be constructed of any suitable material, e.g., a rigid polymer or a metal. During the oblique impact, the first frame member 12 rotates from an undeployed state to the deployed state. In the undeployed state, the first frame member 12 may be adjacent, i.e., proximately close and similarly aligned, to an interior side 38 of the seat back 34. The first frame member 12 may extend downward, i.e., generally extending toward a floor of the vehicle 110 at a shallow angle, e.g., 0-45 degrees relative to the floor, from the mounting location in the undeployed state. The first frame member 12 may be located on or in a side 38 of the seat back 34, i.e., substantially flush with, or beneath a surface of, the side 38 (and in any case generally covered by a fabric, leather, etc. seat cover).

Figure 2:
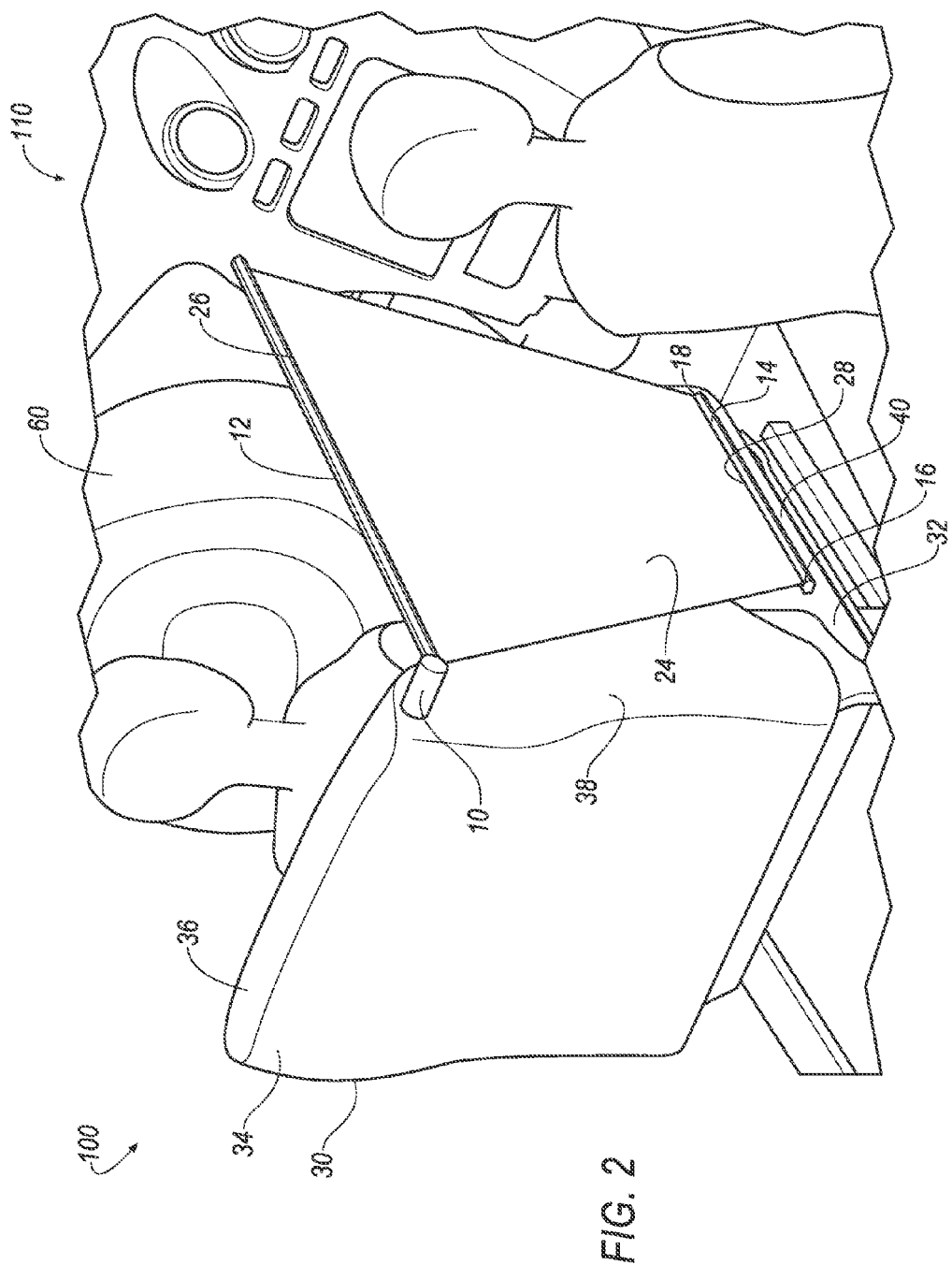
FIG. 2 is a perspective view of the passenger protection system of FIG. 1 in a deployed state.
Figure 6B:
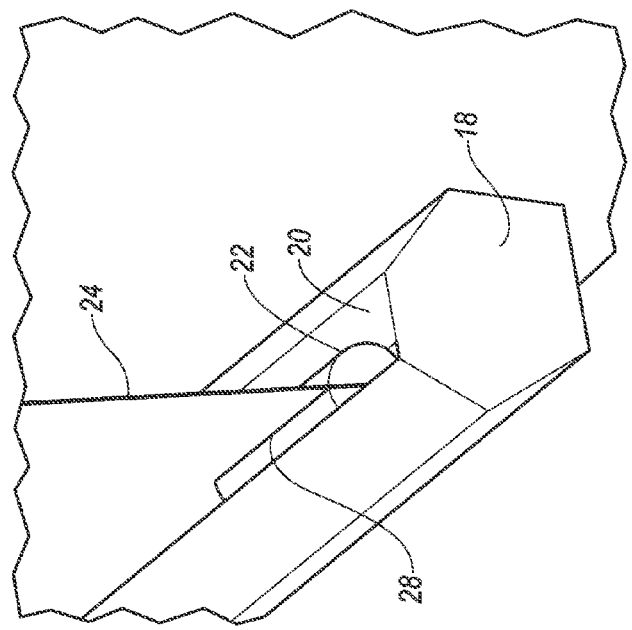
FIG. 6B is a magnified view of an example of a movable element disposed within a passenger protection system.
Figure 6A:
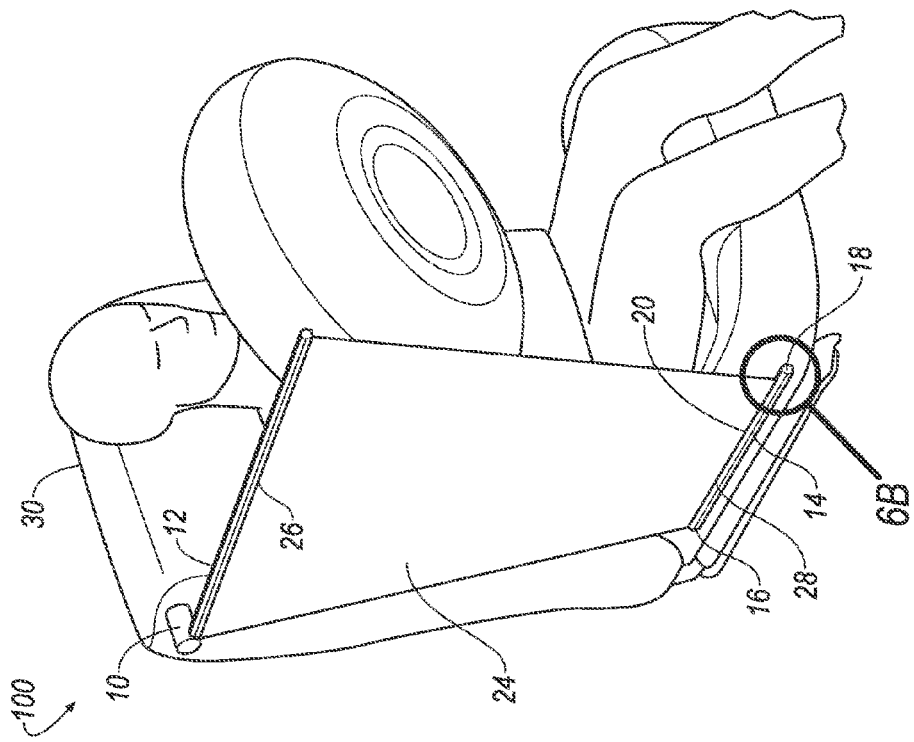
FIG. 6A is a perspective view of the passenger protection system of FIG. 5 in the deployed state.

The flexible sheet 24, as mentioned above, is arranged to receive a vehicle occupant during an oblique impact when the sheet 24 is in a deployed state. As seen, for example, in FIG. 2, the flexible sheet 24 has an upper edge 26 attached to the first frame member 12. The passenger protection system 100 generally further includes a second frame member 14. The second frame member 14 may be constructed of any suitable material, e.g., a rigid polymer or a metal. The second frame member 14 has a first end 16 and a second end 18. The first and second ends 16, 18 may be fixedly mounted to a portion of the vehicle 110, e.g., a side 40 of the vehicle seat base 32. The second frame member 14 may have a longitudinal cavity 20, best illustrated in FIGS. 6A and 6B, extending from the first end 16 to the second end 18. The second frame member 14 may be disposed in or on a side 40 of the seat base 32, i.e., substantially flush with, or beneath a surface of, the side 40 (and in any case generally covered by a fabric, leather, etc. seat cover).

At least a portion of a lower edge 28 of the flexible sheet 24 may be attached to the second frame member 14. During an oblique impact, the flexible sheet 24 may extend from the first frame member 12 to the second frame member 14 to receive the occupant. In an embodiment, the flexible sheet 24 may tautly extend between the first and second frame members 12, 14, in a deployed state, forming the impact surface for the occupant. The term "tautly" as used herein means that the flexible sheet 24 extends with substantially no slack between the first frame member 12 and the second frame member 14. However, even when taut, the flexible sheet 24 may, e.g., due the nature of flexible material used for the flexible sheet 24, e.g., an elastic polymer or fabric, have some ability to flex or give to thereby absorb energy, e.g., when the flexible sheet 24 is impacted by an object such as a human head or other body part.

A movable element 22 may be disposed in the longitudinal cavity 20. At least a portion of the lower edge 28 of the flexible sheet 24 may be attached to the movable element 22, best seen in FIG. 6B. When the first frame member 12 rotates, the movable element 22 slides from the first end 16 to the second end 18, stretching the flexible sheet 24 between the first frame member 12 and the second frame member 14. The movable element 22 may be of any construction that allows rapid movement along the longitudinal cavity 20, e.g., a metallic sphere, a polymeric cylinder, or a ceramic bar. The use of a movable element 22 allows the flexible sheet 24 to maintain a limited profile when in the undeployed state and to extend along the vehicle seat 30 in the deployed state.

The flexible sheet 24 may be constructed of any suitable material, e.g., a flexible polymer or a fabric. During an oblique impact, the first frame member 12 rotates from the undeployed state in or on the seat back 34 side 38 into the deployed state, extending the flexible sheet 24. The use of the flexible sheet 24 advantageously allows the passenger protection system 100 to maintain a limited profile in the undeployed state.

The passenger protection system 100 typically includes a triggering mechanism 11 as part of the impact sensing sub-system 70. The rotatable attachment 10 can be arranged to hold the first frame member 12 in the undeployed state until triggering of the triggering mechanism 11. When triggered, the triggering mechanism 11 causes the first frame member 12 to rotate about an axis A of the rotatable attachment 10 into the deployed state. The triggering mechanism 11 allows the passenger protection system 100 to rapidly deploy during the impact. In an embodiment, the triggering of the triggering mechanism 11 causes the rotatable attachment 10 to extend along the axis A toward the seat back 34 side 38, the axis A being substantially parallel to the upper edge 36 of the seat back 34. The rotatable attachment mechanism 10 then rotates, causing rotation of the first frame member 12, extending the flexible sheet 24 and forming an impact surface for a vehicle 110 occupant.

Figure 3:
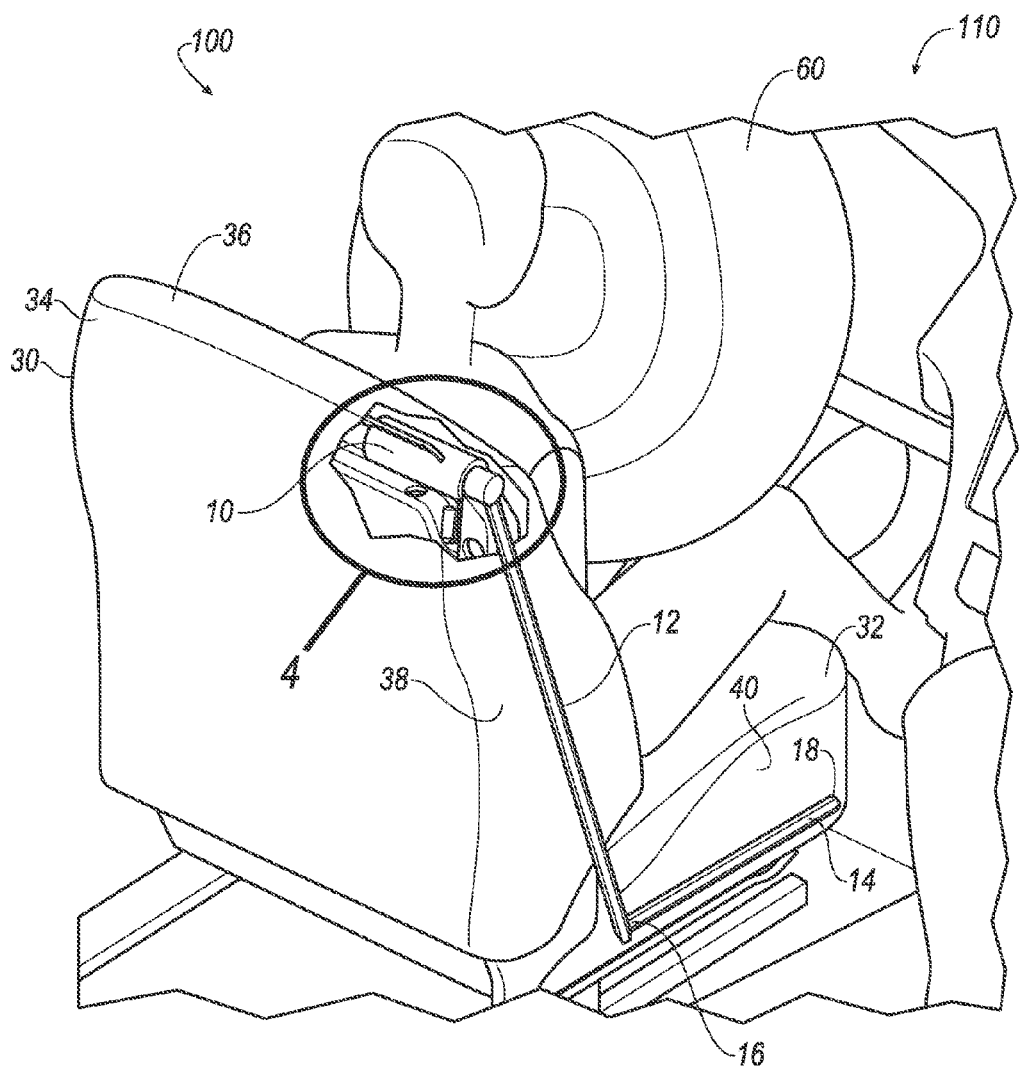
FIG. 3 is a perspective view of an example of a rotatable attachment for use in a passenger protection system.
Figure 4:
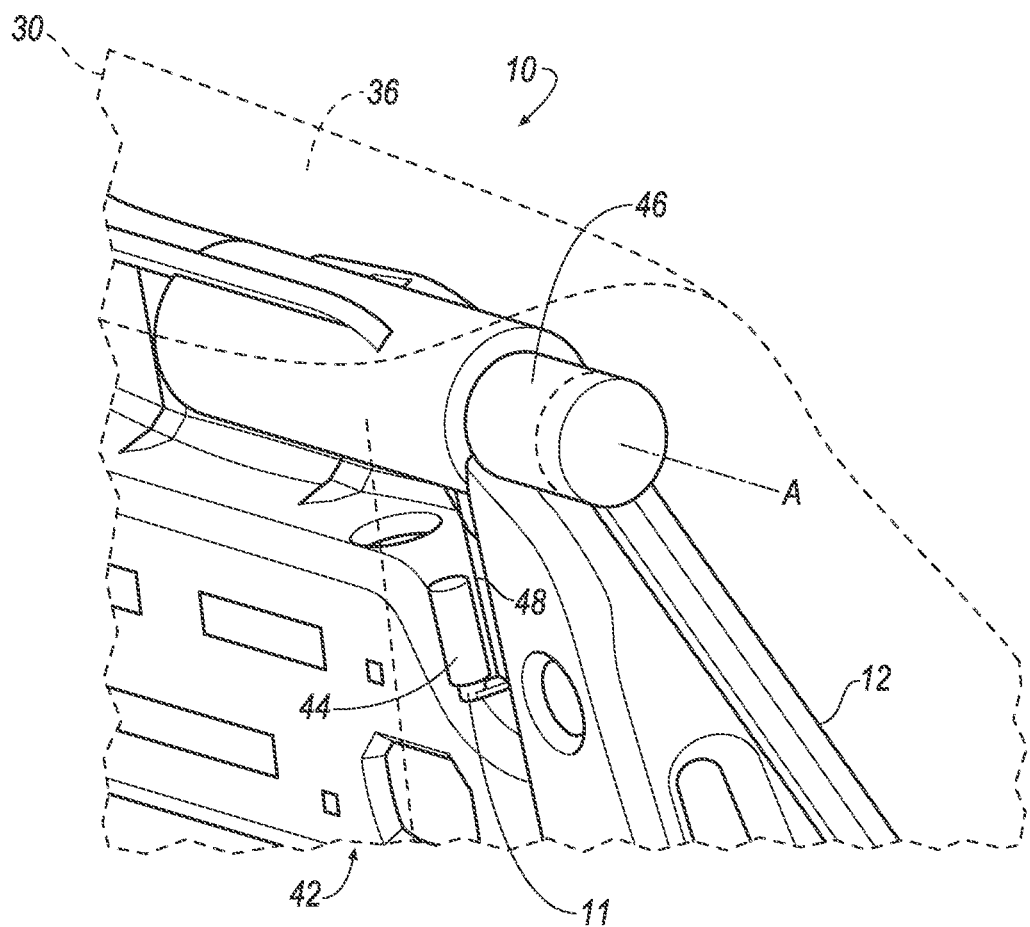
FIG. 4 is a magnified view of the rotatable attachment of FIG. 3.
Figure 5:
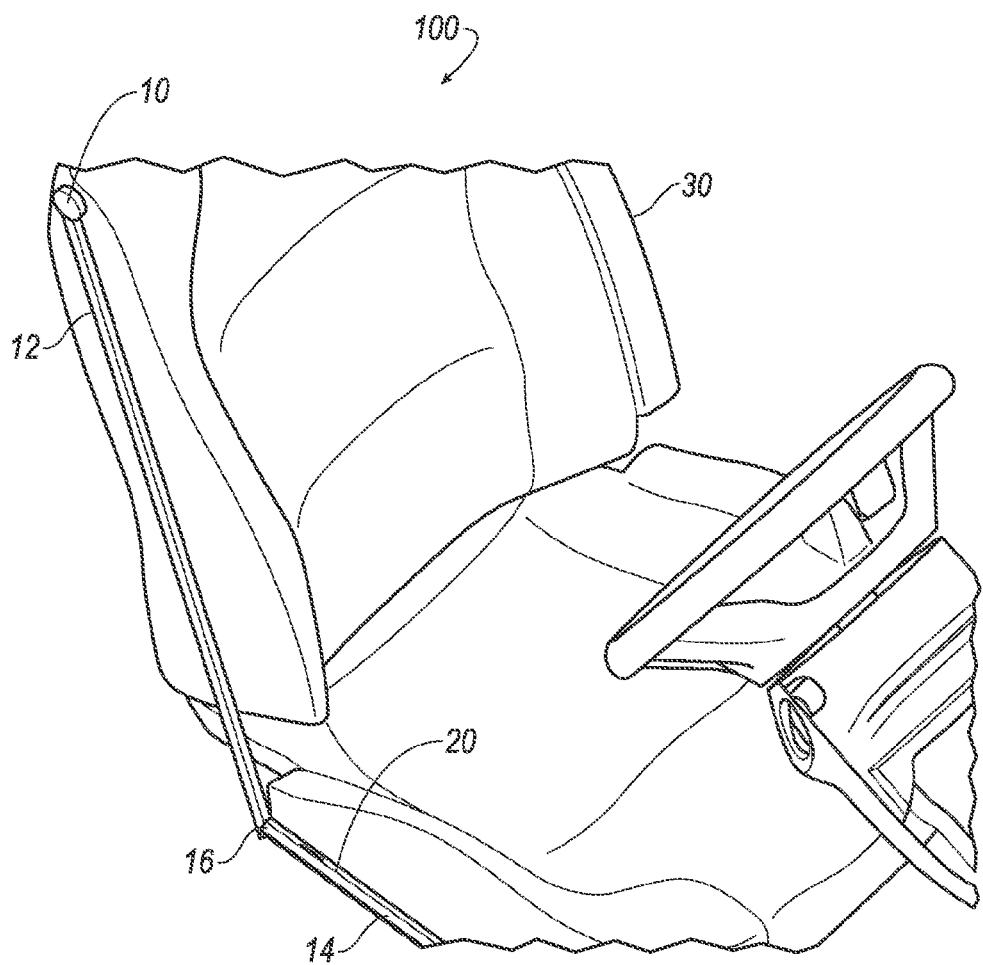
FIG. 5 is a perspective view of an example of a passenger protection system, including a longitudinal cavity, in the undeployed state.

The rotatable attachment 10 may be a pretensioner 42, as illustrated in FIGS. 3 and 4. The pretensioner 42 may include a piston 44, a shaft 46, and a cable 48. Further, the triggering mechanism 11 may be an ignitable charge. The shaft 46 is connected to the first frame member 12, and the cable 48 connects the piston 44 to the shaft 46. When triggered, the ignitable charge is ignited, moving the piston 44, which extends the cable 48, rotating the shaft 46 and the first frame member 12 into the deployed state. The use of the pretensioner 42 allows for rapid deployment of the passenger protection system 100.

Alternatively, the rotatable attachment 10 may include other known mechanisms, such as an electric motor or a rotatable spring tightened and locked with a lock pin. The electric motor may be attached to the first frame member 12 and rotate upon triggering of the triggering mechanism 11, moving the first frame member into the deployed state. The rotatable spring may be attached to the first frame member 12 and rotate the first frame member 12 when the triggering mechanism 11 releases the lock pin, releasing the rotatable spring and rotating the first frame member 12 into the deployed state.

Figure 7:
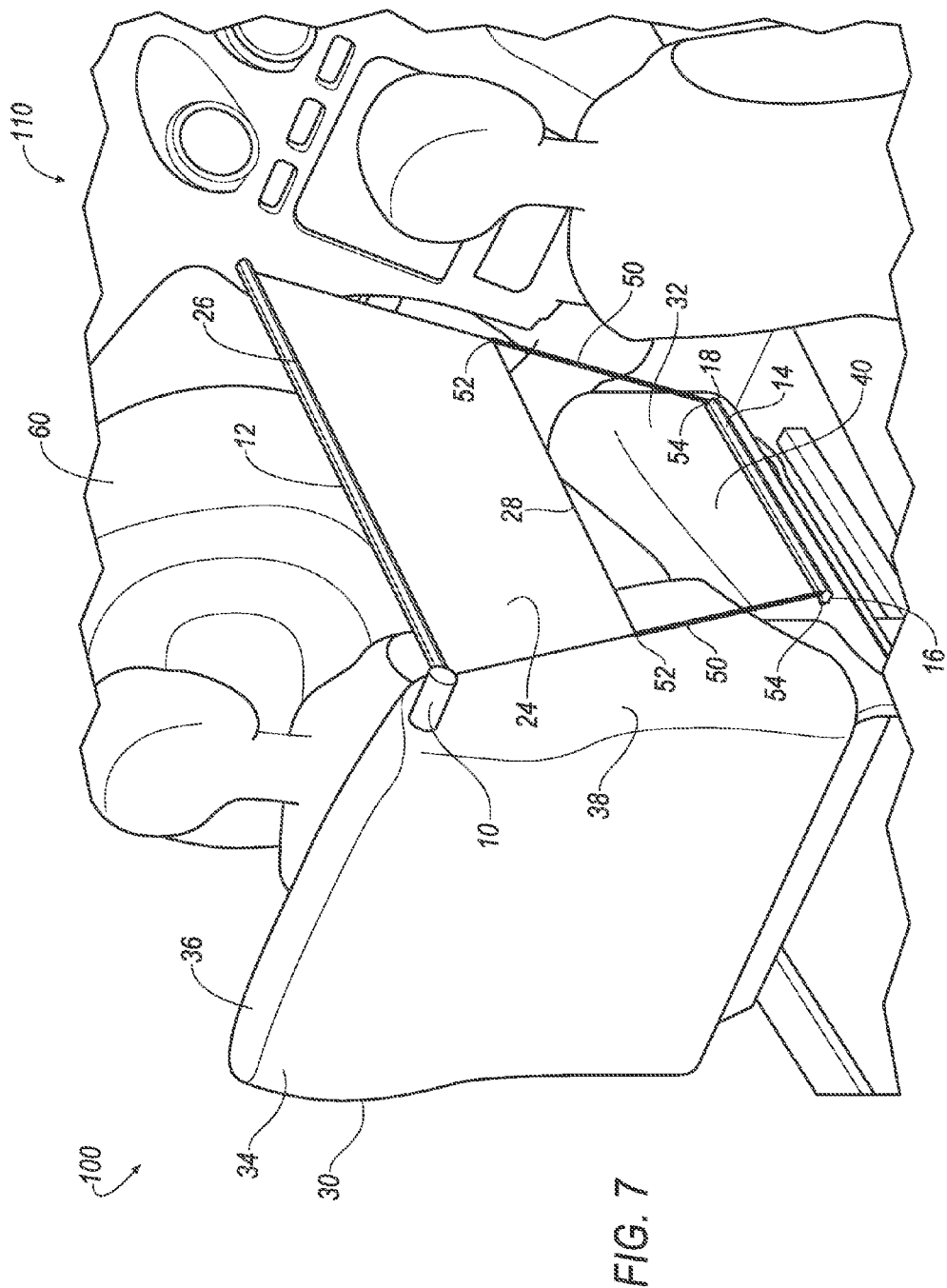
FIG. 7 is an example of a passenger protection system with tethers.

As illustrated in FIG. 7, the passenger protection system 100 may include at least one tether 50. The tether 50 may be attached at a first end 52 to the flexible sheet 24 and connectable at a second end 54 to the vehicle seat 30, the movable element 22, or the second frame member 14. The tether 50 may of any suitable construction, e.g., a flexible polymer or a fabric thread. The tether 50 extends the flexible sheet 24 in the deployed state, allowing further customization of the size and shape of the flexible sheet 24. In an embodiment, the tether 50 may connect the lower edge 28 of the flexible sheet 24 to the movable element 22. Upon triggering, the movable element 22 moves along the longitudinal cavity 20, and the attached tether 50 extends the flexible sheet 24 tautly between the first and second frame members, creating the impact surface for the occupant.

Figure 8:
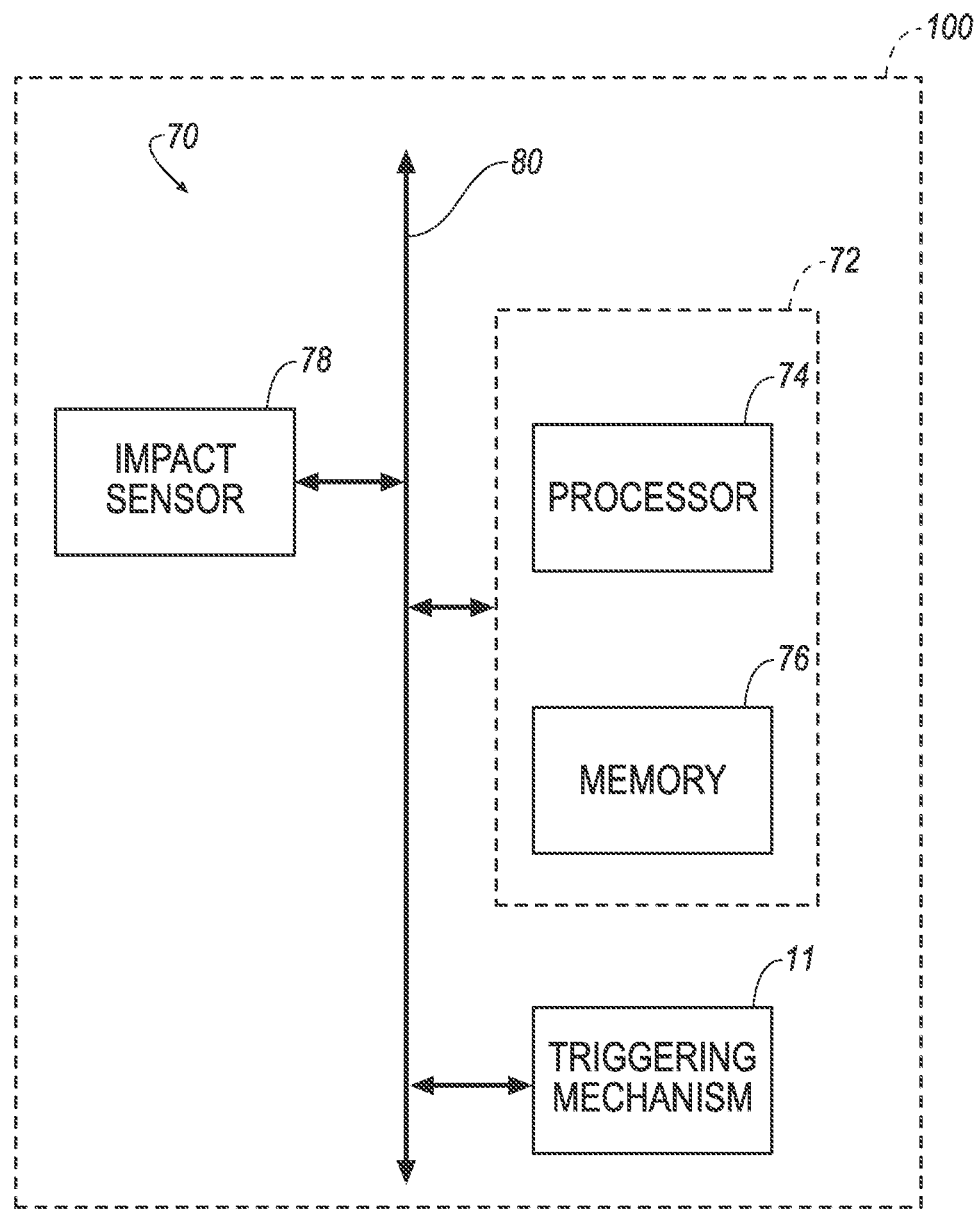
FIG. 8 is a block diagram of an impact sensing sub-system for the passenger protection system.

The passenger protection system 100 may include an impact sensing sub-system 70, as stated above and illustrated in FIG. 8. The controller 72 of the impact sensing sub-system 70 generally includes a processor 74 and a memory 76. The memory 76 stores instructions executable by the processor 74 to identify an oblique impact. The controller 72 is generally further programmed to, upon identifying the oblique impact, cause triggering of the triggering mechanism 11, moving the passenger protection system 100 from the undeployed state to the deployed state.

An impact sensor 78 such as is known is typically in communication with the controller 72 to communicate data to the controller 72. The impact sensor 78 may be of any suitable type, e.g., using accelerometers, radar, lidar, and/or a vision system. The vision system may include one or more cameras, CCD image sensors, and/or CMOS image sensors, etc. Based on data communicated by the impact sensor 78, the controller 72 may cause triggering the triggering mechanism 11.

Communications between the controller 72, the impact sensor 78, the triggering mechanism 11, and or other components in the vehicle 110, may be connected to a communication bus 80, such as a controller area network (CAN) bus, of the vehicle 110. The controller 72 may use information from the communication bus 80 to control the triggering of the triggering mechanism 11. The triggering mechanism 11 may be connected to the controller 72 or may be connected to the communication bus 80, as shown in FIG. 8.

The vehicle 110 may include an airbag 60. In the deployed state, the flexible sheet 24 and the airbag 60 may contact, providing a continuous impact surface for the occupant during the oblique impact. The continuous impact surface may receive the occupant from several directions, absorbing crash energy.

The rotatable attachment 10 may be disposed in any suitable vehicle component, including but not limited to a vehicle seat, a vehicle roof, an instrument panel, a console, a package tray, and/or a headrest. A portion of at least one frame, such as a frame member, may be attached to the rotatable attachment 10 in any suitable manner to allow rotation of the frame. The flexible sheet 24 may have any suitable portion, such as an edge, attached to the frame in any suitable manner to allow the flexible sheet 24 to extend when the frame is rotated. The flexible sheet 24 may extend tautly, i.e., with substantially no slack, when the frame is rotated. At least one tether 50 may be arranged to attach the flexible sheet 24 to any suitable attachment point, including but not limited to a vehicle component, the frame, and/or the rotatable attachment.

As used herein, the adverb "substantially" means that a shape, structure, measurement, quantity, time, etc. may deviate from an exact described geometry, distance, measurement, quantity, time, etc., because of imperfections in materials, machining, manufacturing, etc.

In the drawings, the same reference numbers indicate the same elements. Further, some or all of these elements could be changed. With regard to the components, processes, systems, methods, etc. described herein, it should be understood that these are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A passenger protection system, comprising:
   a rotatable attachment mountable in a vehicle seat back and rotatable about an axis;

a first rigid frame member extending from the rotatable attachment so as to define a non-zero angle with the axis of rotation; and a flexible sheet having an upper edge connected to the first rigid frame member.

2. The system of claim 1, further comprising a triggering mechanism, the rotatable attachment being arranged to hold the first rigid frame member in an undeployed state until triggering of the triggering mechanism causes the first rigid frame member to rotate about the axis of the rotatable attachment, thereby placing the system in a deployed state.

3. The system of claim 2, wherein the rotatable attachment comprises a pretensioner that includes a piston, a shaft connected to the first rigid frame member, and a cable connecting the piston to the shaft, wherein the triggering mechanism is an ignitable charge that, when ignited, moves the piston, thereby extending the cable and rotating the shaft.

4. The system of claim 2, wherein the rotatable attachment comprises an electric motor having a shaft connected to the first rigid frame member, wherein the triggering includes causing the electric motor to rotate the shaft.

5. The system of claim 2, further comprising:
a second rigid frame member that has a longitudinal cavity and is mountable on a side of a base of the vehicle seat; and
a movable element disposed in the longitudinal cavity of the second rigid frame member;
wherein at least a portion of a lower edge of the flexible sheet is attached to the movable element such that, when the first rigid frame member rotates, the movable element slides from a first end of the second rigid frame member to a second end of the second rigid frame member, thereby causing the flexible sheet to be stretched between the first rigid frame member and the second rigid frame member.

6. The system of claim 2, further comprising a controller that includes a processor and a memory, the memory storing instructions executable by the processor to identify an oblique impact, and, upon identifying the oblique impact, to cause the triggering of the triggering mechanism.

7. The system of claim 1, further comprising at least one tether attached to the flexible sheet and connectable to a vehicle seat.

8. A passenger protection system, comprising:
a vehicle seat that includes a seat base and a seat back;
a rotatable attachment attached to the seat at a mounting location that is proximate to an upper edge of the seat;
a first rigid frame member rotatably connected to the rotatable attachment such that the first frame member is adjacent to an interior side of the seat back and extends downward from the mounting location when the system is in an undeployed state;
a flexible sheet having an upper edge connected to the first rigid frame member.

9. The system of claim 8, further comprising a triggering mechanism, the rotatable attachment being arranged to hold the first rigid frame member in the undeployed state until triggering of the triggering mechanism causes the first rigid frame member to rotate about an axis of the rotatable attachment, thereby placing the system in a deployed state.

10. The system of claim 9, wherein the rotatable attachment comprises a pretensioner that includes a piston, a shaft connected to the first rigid frame member, and a cable connecting the piston to the shaft, wherein the triggering mechanism is an ignitable charge that, when ignited, moves the piston, thereby extending the cable and rotating the shaft.

11. The system of claim 9, wherein the rotatable attachment comprises an electric motor having a shaft connected to the first rigid frame member, wherein the triggering includes causing the electric motor to rotate the shaft.

12. The system of claim 9, wherein the rotatable attachment is extendable in an axial direction of the upper edge of the seat back upon the triggering of the triggering mechanism.

13. The system of claim 9, further comprising a controller that includes a processor and a memory, the memory storing instructions executable by the processor to identify an oblique impact, and, upon identifying the oblique impact, to cause the triggering of the triggering mechanism.

14. The system of claim 9, further comprising:
a second rigid frame member that has a longitudinal cavity and that is mounted on a side of the seat base; and
a movable element disposed in the longitudinal cavity of the second rigid frame member.

15. The system of claim 14, wherein at least a portion of a lower edge of the flexible sheet is attached to the movable element such that, when the first rigid frame member rotates, the movable element slides from a first end of the second rigid frame member to a second end of the second rigid frame member, thereby causing the flexible sheet to be stretched between the first rigid frame member and the second rigid frame member.

16. The system of claim 14, further comprising at least one tether attached at a first end to the flexible sheet and at a second end to one of the seat, the movable element, and the second rigid frame member.

17. A passenger protection system, comprising:
a rotatable attachment mountable in a vehicle seat back;
a first rigid frame member rotatably connected to the rotatable attachment;
a flexible sheet having an upper edge connected to the first rigid frame member;
a triggering mechanism, the rotatable attachment being arranged to hold the first rigid frame member in an undeployed state until triggering of the triggering mechanism causes the first rigid frame member to rotate about an axis of the rotatable attachment, thereby placing the system in a deployed state; and
a controller that includes a processor and a memory, the memory storing instructions executable by the processor to identify an oblique impact, and, upon identifying the oblique impact, to cause the triggering of the triggering mechanism.

18. The system of claim 17, wherein the rotatable attachment comprises one of:
a pretensioner that includes a piston, a shaft connected to the first rigid frame member, and a cable connecting the piston to the shaft, wherein the triggering mechanism is an ignitable charge that, when ignited, moves the piston, thereby extending the cable and rotating the shaft; and
an electric motor having a shaft connected to the first rigid frame member, wherein the triggering includes causing the electric motor to rotate the shaft.

19. The system of claim 8, further comprising a second rigid frame member that has a longitudinal cavity and that is mounted on a side of a seat base and a movable element disposed in the longitudinal cavity of the second rigid frame member.

20. The system of claim 8, further comprising an airbag arranged in the vehicle such that the airbag and the flexible sheet touch one another in a deployed state.

* * * * *